(12) United States Patent
Kim et al.

(10) Patent No.: US 7,138,179 B2
(45) Date of Patent: Nov. 21, 2006

(54) METHOD FOR PREPARING BIODEGRADABLE POLYESTER AND ITSELF PREPARED THEREBY

(75) Inventors: Kyeong Ah Kim, Kyungki-do (KR); Byung Kun Son, Seoul (KR); Yong Gun Jeon, Kyungki-do (KR)

(73) Assignee: Chemical & Medical Research Co., Ltd., Seoul (KR)

( * ) Notice: Subject to any disclaimer, the term of this patent is extended or adjusted under 35 U.S.C. 154(b) by 110 days.

(21) Appl. No.: 10/471,127

(22) PCT Filed: Feb. 20, 2002

(86) PCT No.: PCT/KR02/00264

§ 371 (c)(1),
(2), (4) Date: Feb. 19, 2004

(87) PCT Pub. No.: WO02/072663

PCT Pub. Date: Sep. 19, 2002

(65) Prior Publication Data

US 2004/0138333 A1    Jul. 15, 2004

(30) Foreign Application Priority Data

Mar. 12, 2001    (KR) .......................... 2001-0012674

(51) Int. Cl.
- *B32B 5/16* (2006.01)
- *C08F 283/14* (2006.01)
- *C08L 61/00* (2006.01)

(52) U.S. Cl. ...................... 428/402; 528/222; 528/225; 528/355; 528/357; 528/361; 528/365; 525/471; 524/730; 524/731; 524/783

(58) Field of Classification Search ................ 528/222, 528/225, 355, 357, 361, 365; 525/471, 730, 525/731; 524/730, 731, 783; 428/402
See application file for complete search history.

(56) References Cited

U.S. PATENT DOCUMENTS

| 4,804,691 A | | 2/1989 | English et al. |
| 5,683,723 A | * | 11/1997 | Spenlehauer et al. ........ 424/501 |
| 5,702,717 A | * | 12/1997 | Cha et al. .................... 424/425 |
| 6,297,350 B1 | * | 10/2001 | Kricheldorf et al. ......... 528/354 |

FOREIGN PATENT DOCUMENTS

| WO | WO 94/11441 | 5/1994 |
| WO | WO 01/60425 | 8/2001 |

* cited by examiner

*Primary Examiner*—Samuel A. Acquah
(74) *Attorney, Agent, or Firm*—Bell, Boyd & Lloyd LLC

(57) ABSTRACT

Disclosed is a method for preparing a biodegradable polymer in the form of uniform powder or spherical particles by dispersion polymerization without a grinding step. The method for preparing a biodegradable polyester includes dispersing a monomer in the presence of a catalyst in a dispersion solvent to form a solid or liquid phase for dispersion polymerization and thereby to yield a biodegradable aliphatic polyester in the form of spherical particles or powder, the monomer comprising a mixture of a first compound (e.g., lactide or glycolide) and a second compound being selected from the group consisting of polyhydric alcohols (e.g., glycerin, erythritol, penterythritol or dipentaerythritol) and carprolactone. The present invention readily prepares a biodegradable polymer having a high molecular weight in the form of uniform powder or spherical particles.

19 Claims, 3 Drawing Sheets

METHOD FOR PREPARING BIODEGRADABLE POLYESTER AND ITSELF PREPARED THEREBY

TECHNICAL FIELD

The present invention relates to a method for preparing biodegradable polyester and itself prepared thereby. More particularly, the present invention relates to a method for preparing biodegradable polymer in the form of spherical or amorphous formless particles or powder by polymerizing a monomer in the non-solvent condition for the monomer at a temperature below the melting point of the polymer.

BACKGROUND ART

Biodegradable polymers are now attracting considerable attention, due to their peculiar characteristics related to degradability, in various fields of industry such as medical, agricultural and environmental fields and being considered to be of a great value particularly in the medical and environmental fields.

Biodegradable polymers are largely classified into natural biodegradable polymers and synthetic biodegradable polymers. Natural biodegradable polymers synthesized from naturally occurring substances are very environment-friendly and excellent in physical performance and biological adaptability. But the natural biodegradable polymers are very expensive and uncontrollable in regard to properties, since they are originated from natural substances.

On the other hand, synthetic biodegradable polymers are recently considered to be of a great commercial value because they are controllable in properties, unlike natural biodegradable polymers.

Among the synthetic biodegradable polymers, polyglycolide (PGA) and polylactide (PLA) are particularly excellent in performance and applied for various uses in the medical field due to their environment-friendliness and innoxiousness to living bodies. For example, they have been developed and used for DDS (Drug Delivery System), bone- or tissue-fixing pins, screws or stitching fibers, and so forth.

But the solid process of these polymers may result in non-uniformity of properties, deterioration of workability. Particularly, the polymers prepared in the massive solid state are to be grinded in proper size prior to a forming process, and the polymer grinding step is difficult to perform in the case of mass production on a commercial scale.

For some uses, such as DDS, the polymers are to be controllable in the type and size of particles for the sake of controlling the release rate of drugs. To solve this problem, many studies have been made on the preparation methods for minutely controlling the dissolution-extraction process of the polymer using solvent and non-solvent conditions, for example, by SAS (Supercritical Anti-Solvent) method. But these preparation methods are incomplete in that the polymer is uncontrollable in molecular weight and particle size and the production yield is extremely low.

DISCLOSURE OF INVENTION

It is therefore an object of the present invention to solve the problems with the prior art and to provide a novel method for preparing biodegradable polymer, such as polylactide (PLA), polyglycolide (PGA) or polycaprolactone (PCL), in the form of spherical particles or the like directly by dispersion polymerization without a grinding step.

It is another object of the present invention to provide a method for readily preparing biodegradable polymer particles for medical uses such as DDS with high yield.

To achieve the objects of the present invention, there is provided a method for preparing a biodegradable polyester that includes dispersing monomer in the presence of a catalyst in a dispersion solvent to form a solid or liquid phase for dispersion polymerization and thereby to yield a biodegradable aliphatic polyester in the form of spherical particles or powder, the monomer comprising a mixture of a compound (A) represented by the following formula I and a compound (B) being selected from the group consisting of compounds represented by the following formulas II to V and caprolactones:

[Formula I]

wherein R1 and R2 are a hydrogen or a $C_1$–$C_4$ alkyl group;

$$HO-C(=O)-(CH_2)_n-(O=)C-OH \qquad \text{[Formula II]}$$

wherein n is 1 to 8;

$$H-O-(CH_2)_m-O-H \qquad \text{[Formula III]}$$

wherein m is 2 to 8;

$$R^3(OH)_x \qquad \text{[Formula IV]}$$

wherein x is 2 to 6; and R3 is a saturated $C_1$–$C_8$ hydrocarbon or an ether (—R—O—R—); and $$H-O-\{(CH_2CH_2)_yO\}_z-H \qquad \text{[Formula V]}$$

The content of the compound (A) in the monomer is preferably at least 75 mol %, more preferably at least 85 mol %, and the content of the compound (B) is preferably less than 25 mol %, more preferably less than 15 mol %.

Preferably, the compound (A) is lactides or glycolides, and the compound (B) of formula(V) is polyhydric alcohols, for example, glycerin, erythritol, pentaerithritol or dipentaerithritol, etc.

The preferred dispersion solvent as used herein should meet the following requirements:
(1) to be an organic compound in which the polymer has no solubility;
(2) to be an organic compound in which the monomer has a solubility of less than 5%;
(3) to be chemically inert with the monomer;
(4) to have a viscosity of 1 to 300 cSt at 25° C.; and
(5) to have a lower specific density of 0.85 to 1.25 than the polymer. Examples of the preferred dispersion solvent may include alkyl/aryl-substituted siloxane compounds (e.g., poly(dimethylsiloxane), poly(phenyl-methylsiloxane), etc.) and long-chained saturated hydrocarbons (e.g. liquid paraffin).

The polymerization temperature is preferably between the melting point $T_m$ of the polymer and the higher temperature out of the melting point $T_m$ of the monomer and the glass transition temperature $T_g$ of the polymer. More preferably, the polymerization temperature is in the range of ⅓ to ⅔ between the melting point of the polymer and the higher temperature of the melting point of the monomer and the glass transition temperature of the polymer.

Preferably, the polymerization is performed under vacuum or in the inert gas atmosphere.

The catalyst is added directly to the monomer or preferably to the medium for the sake of enhancing the uniformity of the particle size and the polymerization degree.

Now, the present invention will be described in further detail with reference to the accompanying drawings.

The present invention comprises a method for preparing a biodegradable polymer having a weight average molecular weight of at least 10,000 to 500,000 in the form of spherical or amorphous particles or powder by polymerizing a monomer in non-solvent or poor solvent conditions at a temperature lower than the melting point of the corresponding polymer.

The present invention is directed to a method for preparing a biodegradable polymer that comprises a copolymer of a homopolymer of one monomer (A) represented by the following formula I with a compound (B) selected from the compounds represented by the following formulas II to V and caprolactones:

[Formula I]

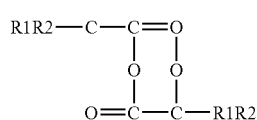

wherein R1 and R2 are a hydrogen or a $C_1$–$C_4$ alkyl group;

   [Formula II]

wherein n is 1 to 8;

   [Formula III]

wherein m is 2 to 8;

   [Formula IV]

wherein x is 2 to 6; and R3 is a saturated $C_1$–$C_8$ hydrocarbon or an ether (—R—O—R—); and

   [Formula V]

More specifically, the present invention relates to the preparation of a biodegradable homopolymer or copolymer comprising at least 75 mol %, more preferably 85 mol % of the monomer component (A) and less than 25 mol %, more preferably 15 mol % of the monomer component (B).

The specific examples of the compound of the formula I may include lactide and glycolide. These compounds, i.e., lactide and glycolide are in most cases obtained in a racemic mixture of D- and L-forms depending on the bonding types of R1 and R2. Preferably, the monomers as used in the present invention preferably contain at least 85% of D- or L-form.

In the present invention, the dispersion solvent completely dehydrated is added to the reactor and then the monomer is added in the form of powder or in the melted state. The ratio of the monomer to the dispersion solvent is in the range of 10 to 80% (w/v), more preferably 30 to 70% (w/v). When the ratio of the monomer to the dispersion solvent is less than 10% (w/v), the polymer can be prepared in the form of powder but a large amount of the dispersion solvent is used per unit weight of the polymer, which is undesirable in the aspect of economy. The content of the monomer exceeding 80% deteriorates the dispersability of the monomer in the dispersion solvent, as a result of which the polymer aggregates together in the process of the polymerization reaction and the polymer having a low crystallinity sticks on the inner wall of the reactor due to the shear force caused by stirring. These problems prevent the production of polymers in the form of spherical particles or powder in uniform size.

As for the requirements of the dispersion solvent, the dispersion solvent should show neither of solubility to the polymer nor chemical reaction that may adversely affect the polymerization reaction, such as a change in the chemical structure of the monomer or the bonding to the monomer.

A slight amount of the polymer soluble in the dispersion solvent can prevent the formation of the polymer in the dispersion solvent. The polymer is further dissolved in the dispersion solvent to form a solution with the progress of the polymerization reaction, changing the viscosity and increasing the molecular weight. As a result, polymer particles aggregate together without formation of uniform particles.

Furthermore, when the cyclic monomer reacts with the dispersion solvent to form a compound, tile reactants are deteriorated in purity to rapidly lower the polymerization reactivity and polymers of a high molecular weight cannot be produced.

Other properties suggested as requirements of the dispersion solvent are solubility of the monomer in the dispersion solvent, viscosity and specific density.

The solubility of the monomer in the dispersion solvent is desirably low as less than 5%. When the solubility is high, solution polymerization prevails over dispersion polymerization (i.e., suspension polymerization or emulsion polymerization), making it difficult to form polymer particles and limiting the degree of polymerization.

The viscosity of the dispersion solvent is preferably 1 to 300 cSt at 25° C. When the viscosity is out of this range, there is a problem in realizing uniform dispersion due to an extremely large difference in viscosity between the dispersion solvent and the melted monomer, and the size and form of polymer particles cannot be controlled.

The specific density of the dispersion solvent is preferably in the range of from 0.85 to 1.25 at 25° C. When the specific density is less than 0.85, the melted monomer is settled in the dispersion solvent and scarcely dispersed uniformly even with vigorous agitation, as a result of which the polymer cannot be obtained in the form of uniform particles. Otherwise when the specific density of the dispersion solvent is greater than 1.25, or exceeds that of the polymer to be produced, the polymer as well as the monomer is floated on the surface of the dispersion solvent to prevent effective mixing.

Now, a description will be given to the method for preparing a polymer using a dispersion solvent and a monomer according to the present invention.

After the addition of the dispersion solvent and the monomer, the reactor is sealed up and connected to a vacuum pump to form vacuum for at least one hour and thereby to remove air, oxygen, water and impurities other than polymers from the dispersion solvent and the monomer. The polymerization reaction is performed under vacuum or in the inert gas atmosphere, including the nitrogen atmosphere, which is to prevent introduction of dissolved oxygen and water that may otherwise inhibit the increase in the degree of polymerization.

Following the removal of impurities under vacuum, the reactants are heated to a temperature above the melting point of the monomer and stirred to disperse the melted monomer in the form of droplets in the dispersion solvent. The mixing speed should be controlled properly in consideration of the fact that the dispersion solvent and the monomer are not mixed but separated into two phases due to the difference of specific gravity. When the mixing speed is too high, the shear force forms a stream of the monomer having a higher specific gravity on the inner wall of the reactor or the centrifugal force sticks the monomer on the inner wall of the reactor. At an extremely low mixing speed, the monomer solution of the higher specific gravity is settled to lower the dispersion effect and to prevent formation of uniform droplets. Thus the mixing speed is to be properly controlled depending on the size or shape of the reactor such that the melted monomer can circulate stably in the dispersion solvent.

The polymerization temperature is dependent on the type of the monomer and on whether the polymerization reaction is homopolymerization or copolymerization. The optimal temperature is preferably determined between the melting point (crystal transition temperature) of the polymer and the higher temperature of the melting point $T_m$ of the monomer and the glass transition temperature of the polymer. More preferably, the polymerization temperature is in the range of ⅓ to ⅔ between the melting point of the polymer and the higher temperature of the melting point of the monomer and the glass transition temperature of the polymer.

A catalyst is added when the monomer solution is uniformly dispersed in the dispersion solvent and the temperature reaches the optimal polymerization temperature. The catalyst in the liquid state may be added directly as the formulated concentrate, or previously dissolved or dispersed in a solvent such as toluene, ethyl acetate or hexane or the dispersion solvent for polymerization. In some cases, the catalyst can be added directly to the monomer. The catalyst for the biodegradable polymer to be prepared in the present invention is variable and, as well known in the art, the polymerization is performed through various mechanisms according to the type of the catalyst used.

Zn—, Sn— or Al-based organic metallic catalysts are typically used as the catalyst. Specific examples of the organic metallic catalyst may include: Sn-based catalysts (e.g., stannic chloride, stannous oxide, stannous octoate, stanlous chloride dihydrate, tetraphenyl tin, etc.); Zn-based catalysts (e.g., zinc powder, diethyl zinc, zinc octoate, zinc chloride, zinc oxide, etc.); and Al-based catalysts (e.g., aluminum chloride, aluminum ethoxide, etc.). Among these catalysts, stannous octoate and aluminum chloride are preferred.

In the present invention, the molecular weight of the polymer can be controlled by the added amount of the catalyst, the polymerization temperature and the polymerization time. Among these factors, the added amount of the catalyst is most important in the control of the molecular weight.

In the present invention, the polymer can be obtained in the form of uniform spherical particles (0.5 to 100 μm in particle size) when the viscosity of the dispersion solvent is lower than that of the monomer; or in the form of amorphous particles when the viscosity of the dispersion solvent is equal to or higher than that of the monomer.

Furthermore, in the present invention, the size of the polymer particles thus produced is mainly dependent on the mixing speed and the solid content, and the final yield after the complete removal of the unreacted monomer amounts to 90 to 95%.

BRIEF DESCRIPTION OF THE DRAWINGS

Further objects and advantages of the invention can be more fully understood from the following detailed description taken in conjunction with the accompanying drawing in which.

BEST MODE FOR CARRYING OUT THE INVENTION

The present invention will now be described in detail by way of the examples of the present invention and the comparative examples.

EXAMPLE 1

200 g of L-lactide as the monomer (A) and 500 ml of polydimethylsiloxane having a viscosity of 10 cSt as the dispersing solvent were added to a flask and removed of air and impurities under vacuum. After melting L-lactide at a raised temperature of 130° C., 0.1 g of stannous 2-ethyl hexanoate was added to the flask with vigorous stirring under vacuum for 24 hours of polymerization reaction. The polymer thus obtained in the powder form was washed with methanol and hexane several times and then dried at the room temperature under vacuum for 24 hours.

The molecular weight of the polymer as determined by solution viscosity method was reduced to a weight average molecular weight according to the "Mark-Houwink" equation that expresses the relationship between intrinsic viscosity and molecular weight.

For linear polylactide (PLLA), $[\eta]=4.41\times10^{-4}\cdot M_w^{0.72}$ (dl/g)

For star-like (branched) PLLA, $[\eta]=2.04\times10^{-4}\cdot M_w^{0.72}$ (dl/g)

To determine the intrinsic viscosity [η], the reduced viscosity was measured with an Ubbelohde viscometer at 25° C. using a solution of the polymer in chloroform (0.05 to 0.5 g/dL) and then extrapolated by 0%.

Figure 1:
FIG. 1 is an SEM picture of the biodegradable polymer prepared according to an embodiment of the present invention.

The final product, poly(L-lactide) was obtained in the form of spherical particles having an average diameter of 10 μm as shown in FIG. 1 with a weight average molecular weight of 420,000.

EXAMPLES 2 TO 10

The procedures were performed in the same manner as described in Example 1, excepting that the monomer components (A) and (B) and the dispersion solvent were used with reference to Table 1. The molecular weight and the properties of the biodegradable polymers thus obtained are presented in Table 1.

TABLE 1

Examples 2 to 10

Figure 2:
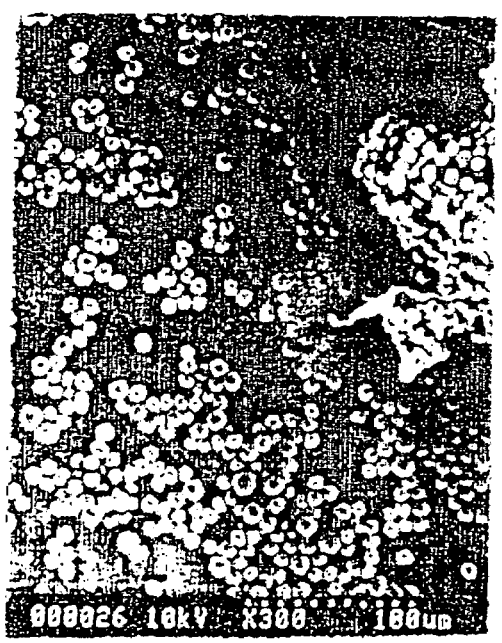
FIG. 2 is an SEM picture of the biodegradable polymer prepared according to another embodiment of the present invention.
Figure 3:
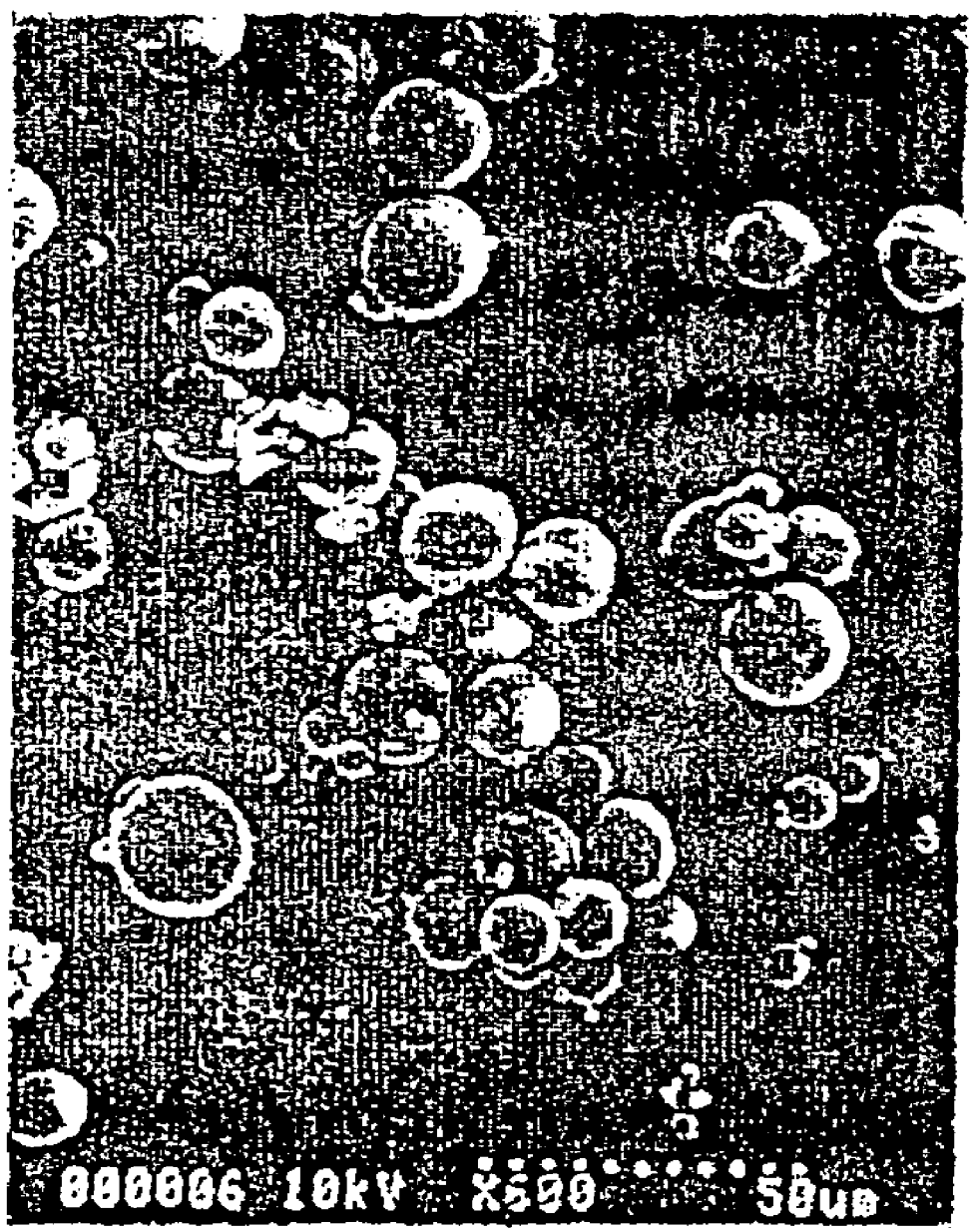
FIG. 3 is an SEM picture of the biodegradable polymer prepared according to further another embodiment of the present invention.
Figure 4:
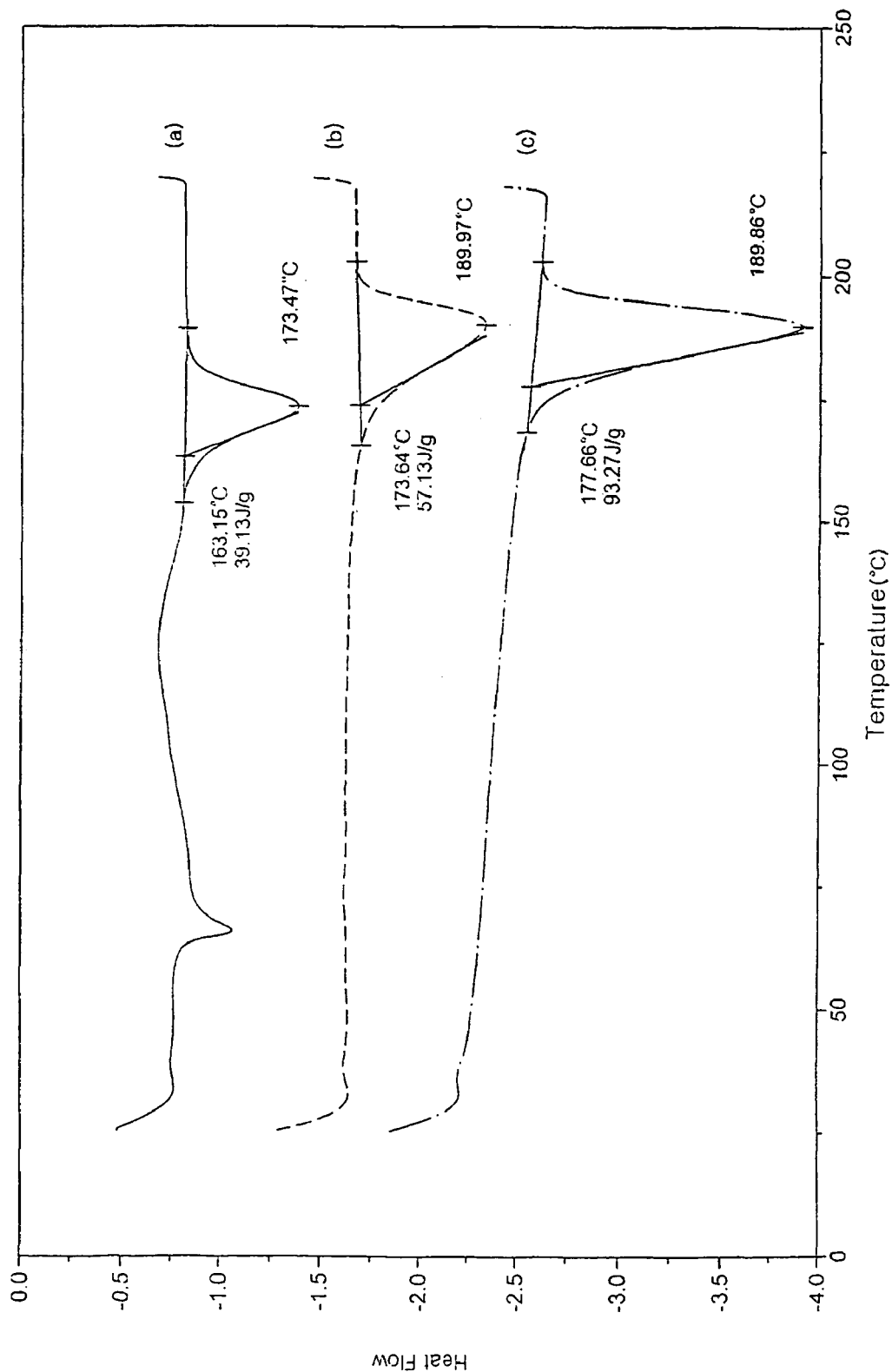
FIG. 4 shows DSC (Differential Scanning Calorimetry) records of the biodegradable polymers prepared according to the examples of the present invention and the comparative examples.

| | Monomer | | | Dispersion medium | | | Monomer/ | | particle | | | |
|---|---|---|---|---|---|---|---|---|---|---|---|---|
| | Ingredient A | Ingredient B | B/(A + B) | type | viscosity | volume (ml) | Dispersion medium | Molecular weight | Shape | Size (μm) | Δ $H_{Tm}$ (J/g) | Remarks |
| 2 | LLA | — | 0% | Polydimethylsiloxane | 200 cSt | 500 | 20% | 370,000 | amorphous | 20 | 87.6 | FIG. 2 |
| 3 | LLA | — | 0% | Polyphenylmethylsiloxane | 10 cSt | 500 | 10% | 400,000 | spherical | 2 | 93.3 | FIG. 4 © |
| 4 | LLA | — | 0% | Polydimethylsiloxane | 10 cSt | 500 | 80% | 740,000 | spherical | 70 | 81.0 | |
| 5 | LLA | Er | 0.2% | Polydimethylsiloxane | 10 cSt | 500 | 60% | 760,000 | spherical | 25 | 89.4 | |
| 6 | LLA | — | 0% | Liquid Paraffin | 30 cSt | 500 | 20% | 480,000 | spherical | 110 | 76.6 | |
| 7 | GA | — | 0% | Polydimethylsiloxane | 10 cSt | 500 | 40% | 680,000 | spherical | 50 | 105 | |
| 8 | LA | GA | 20% | Polydimethylsiloxane | 10 cSt | 500 | 40% | 560,000 | spherical | 15 | 56.1 | FIG. 3 |
| 9 | LLA | CL | 10% | Polydimethylsiloxane | 10 cSt | 500 | 10% | 280,000 | spherical | 5 | 42.3 | |
| 10 | LLA | Er, SA, EG | 5% | Polydimethylsiloxane | 10 cSt | 500 | 40% | 440,000 | spherical | 35 | 47.8 | |

Note:
1) LLA = L-lactide
GA = Glycolide
CL = Caprolactone
Er = Pentaerithritol
SA = Succinic acid
EG = Ethyleneglycol
2) Reduced molecular weight calculated from intrinsic viscosity.
Examples 5, 8, 9 and 10: star-like PLLA reduction equation was applied.
3) Particle type and size: observed with SEM (FIGS. 1, 2 and 3)
Size: average particle size
4) DSC measurement (FIG. 4)

COMPARATIVE EXAMPLES 1 AND 2

The procedures were performed in the same manner as described in Example 1, excepting that the monomer components (A) and (B) and the dispersion solvent were used with reference to Table 2. The molecular weight and the properties of the biodegradable polymers thus obtained are presented in Table 2.

COMPARATIVE EXAMPLE 3

Bulk polymerization was performed only with the L-lactide monomer as listed in Table 2.

TABLE 2

Comparative Example 1, 2 and 3

| | Monomer | | | Dispersion medium | | | Monomer/ | | particle | | | |
|---|---|---|---|---|---|---|---|---|---|---|---|---|
| | Ingredient A | Ingredient B | B/(A + B) | type | viscosity | Volume (ml) | Dispersion medium | Molecular weight | Shape | Size (μm) | Δ $H_{Tm}$ (J/g) | Remarks |
| 1 | LLA | — | 0% | Polydimethylsiloxane | 500 cSt | 500 | 40% | 95,000 | amorphous (random-shaped) | 0.5↓ | 79.5 | Yield rate: below 30%, difficult to collect |
| 2 | LLA | — | 0% | Polydimethylsiloxane | 10 cSt | 500 | 90% | 250,000 | — | — | 57.1 | Impossible to form monomer drop(FIG. 4) |

TABLE 2-continued

Comparative Example 1, 2 and 3

| | Monomer | | | Dispersion medium | | | | particle | | | |
|---|---|---|---|---|---|---|---|---|---|---|---|
| | Ingredient A | Ingredient B | B/(A + B) | type | viscosity | Volume (ml) | Monomer/Dispersion medium | Molecular weight | Shape | Size (μm) | Δ H$_{Tm}$ (J/g) | Remarks |
| 3 | LLA | — | 0% | | | | | 590,000 | | | 39.1 | Bulk polymerization |

As is apparent from the above examples and comparative examples, the preparation method of the present invention allows the preparation of biodegradable polyester particles with a high yield, while solving the problems with the conventional preparation methods that involve a low production yield with the difficulty in recovery of the product (in Comparative Example 1) and a need for grinding and distribution steps so as to obtain workable particles (bulk polymerization in Comparative Example 3).

The polymer obtained in Comparative Example 3, which shows an example of bulk polymerization, has a lower crystallinity than those obtained in the examples of the present invention, as shown in Tables 1 and 2. The heat of fusion Δ H$_{Tm}$ is usually 40 to 60 J/g for bulk polymerization and at least 80 J/g for emulsion polymerization.

INDUSTRIAL APPLICABILITY

The present invention provides a very effective method for preparing a biodegradable material having a high molecular weight in the form of homogeneous powder or spherical particles, which polymer particles are useful for extrusion molding or solid-state extrusion molding. The present invention also provides a preparation method that allows the molecular weight and particle size of the polymer controllable and thereby can be applied in different fields of industry such as pharmaceutical industry that requires polymer powder in the form of fine beads.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for preparing a biodegradable polyester, comprising the steps of:
dispersing a monomer in the presence of a catalyst in a dispersion solvent to form a solid or liquid phase for dispersion polymerization and yielding a biodegradable aliphatic polyester in the form of spherical particles or powder, the monomer comprising a mixture of a compound (A) represented by the following formula I and a compound (B) being selected from the group consisting of compounds represented by the following formulas II to V and caprolactones:

wherein R1 and R2 are a hydrogen or a C$_1$–C$_4$ alkyl group;

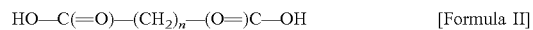

wherein n is 1 to 8;

wherein m is 2 to 8;

wherein x is 2 to 6; and R3 is a saturated C$_1$–C$_8$ hydrocarbon or an ether (—R—O—R—); and

2. The method as claimed in claim 1, wherein the content of compound (A) in the monomer is at least 75 mol % and the content of compound (B) is less than 25 mol %.

3. The method as claimed in claim 1, wherein the content of compound (A) in the monomer is at least 85 mol % and the content of compound (B) is less than 15 mol %.

4. The method as claimed in claim 1, wherein compound (B) represented by the formula V is a polyhydric alcohol.

5. The method as claimed in claim 4, wherein the polyhydric alcohol is selected from the group consisting of glycerin, erythritol, pentaerythritol and dipentaerithritol.

6. The method as claimed in claim 1, wherein the dispersion solvent is an organic compound in which the polymer has no solubility.

7. The method as claimed in claim 1, wherein the dispersion solvent is an organic compound in which the monomer has a solubility of less than 5%.

8. The method as claimed in claim 1, wherein the dispersion solvent is chemically inert with the monomer.

9. The method as claimed in claim 1, wherein the dispersion solvent has a viscosity of 1 to 300 cST at 25° C.

10. The method as claimed in claim 1, wherein the dispersion solvent has a specific density that is lower than a specific density of than the polymer by 0.85 to 1.25.

11. The method as claimed in claim 1, wherein the dispersion solvent is selected from the group consisting of an alkyl/aryl-substituted polysiloxane compound and a long-chained, saturated hydrocarbon.

12. The method as claimed in claim 11, wherein the alkyl/aryl-substituted polysiloxane compound is selected from the group consisting of poly(dimethyl siloxane) and poly(phenylmethyl siloxane).

13. The method as claimed in claim 11, wherein the saturated hydrocarbon is liquid paraffin.

14. The method as claimed in claim 1, wherein the polymerization step is performed at a polymerization temperature between the melting point (crystal transition temperature) of the polymer and the higher temperature out of the melting point of the monomer and the glass transition temperature of the polymer.

15. The method as claimed in claim 14, wherein the polymerization temperature is in the range of 1/3 to 2/3 between the melting point (crystal transition temperature) of the polymer and the higher temperature of the melting point of the monomer and the glass transition temperature of the polymer.

16. The method as claimed in claim 1, wherein the polymerization is performed under a vacuum.

17. The method as claimed in claim 1, wherein the catalyst is added to the dispersion solvent or to the monomer mixture during the polymerization step.

18. A biodegradable polyester in the form of spherical or amorphous(formless) particles or powder as prepared by dispersing a monomer in the presence of a catalyst in a dispersion solvent to form a solid or liquid phase for dispersion polymerization and yielding a biodegradable aliphatic polyester in the form of spherical particles or powder, the monomer comprising a mixture of a compound (A) represented by the following formula I and a compound (B) being selected from the group consisting of compounds represented by the following formulas II to V and caprolactones:

$$R1R2-\underset{\underset{O=C-C-R1R2}{\overset{O}{|}}}{\overset{O}{\overset{|}{C}}}-C=O \quad \text{[Formula I]}$$

wherein R1 and R2 are a hydrogen or a $C_1$–$C_4$ alkyl group;

$$HO-C(=O)-(CH_2)_n-(O=)C-OH \quad \text{[Formula II]}$$

wherein n is 1 to 8;

$$H-O-(CH_2)_m-O-H \quad \text{[Formula III]}$$

wherein m is 2 to 8;

$$R^3(OH)_x \quad \text{[Formula IV]}$$

wherein x is 2 to 6; and R3 is a saturated $C_1$–$C_8$ hydrocarbon or an ether (—R—O—R—); and $$H-O-\{(CH_2CH_2)_yO\}_z-H \quad \text{[Formula V]}$$

19. The method as claimed in claim 1, wherein the polymerization is performed under an inert gas atmosphere.

* * * * *